Aug. 6, 1968
P. W. EAKINS
3,395,409
FOLDING SOFA BED STRUCTURE
Filed Nov. 18, 1966
2 Sheets-Sheet 1
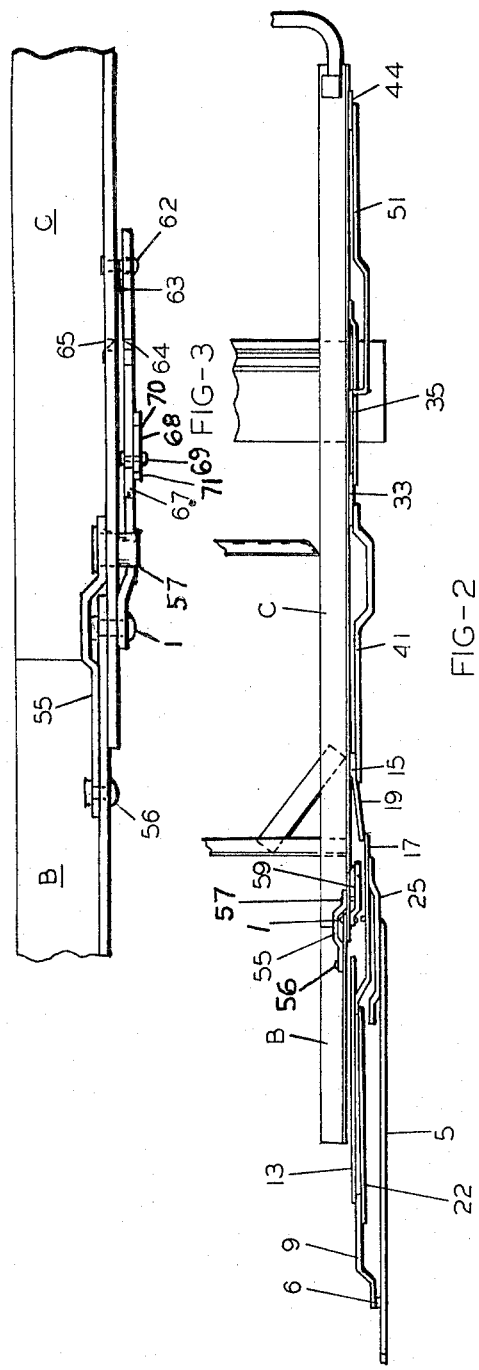
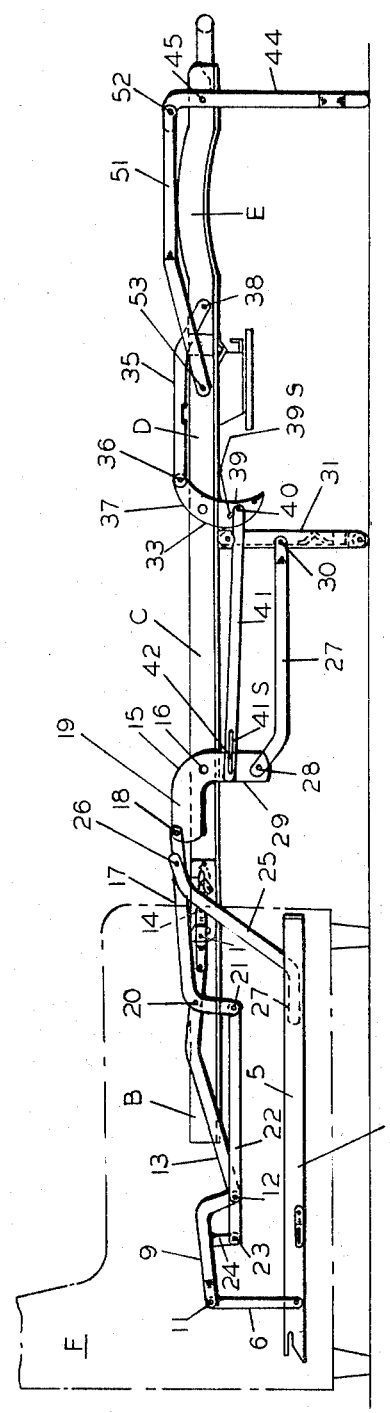
INVENTOR
PAUL W. EAKINS
BY Bedell & Burgess
ATTORNEYS Aug. 6, 1968 P. W. EAKINS 3,395,409
FOLDING SOFA BED STRUCTURE Filed Nov. 18, 1966 2 Sheets-Sheet 2

INVENTOR
PAUL W. EAKINS
BY Bedell & Burgess
ATTORNEYS

United States Patent Office 3,395,409
Patented Aug. 6, 1968

3,395,409
FOLDING SOFA BED STRUCTURE
Paul W. Eakins, St. Louis, Mo., assignor to Foster Bros. Manufacturing Co., St. Louis, Mo., a corporation of Delaware
Filed Nov. 18, 1966, Ser. No. 595,520
10 Claims. (Cl. 5—13)

ABSTRACT OF THE DISCLOSURE

A latch for automatically locking a headrest section of a bed in an inclined position upon movement of the headrest section from the horizontal to the inclined position and automatically releasable to permit return of the headrest section to horizontal position by elevation of the same to an advanced position. The latch comprises an elongated notched plate pivoted at one end to the main pivot pin of the headrest section, and aligned with the headrest section. A support link pivoted to the main bed section remote from the main pivot pin has a projecting pin slidable along a longitudinal surface of the latch plate, which is spring-biased against the support link pin, and the latter surface is notched to receive the support link pin when the head section reaches its normal inclined position and thereby holds the headrest section in its inclined position. A dog is pivoted to the latch plate adjacent the notch and is arranged so that the support link pin will override it when the headrest section is moved to an advanced position, but upon return from the advanced to the normal inclined position, the support link pin will engage the dog and rotate it to close the notch and permit the support link pin to pass over the notch to return to its original position and thus permit return of the headrest section to its horizontal position.

---

The invention relates to folding sofa bed structures having a frame head section selectively movable between horizontal position and an elevated headrest position, and consists particularly in improved means for retaining the headrest in the elevated position.

It is desirable that such frame head sections be automatically latchable in an elevated headrest position, responsive solely to manually actuated movement of the section to this position, and releasable solely responsive to manually actuated advance movement of the head section.

Accordingly, a main object of the invention is to provide an automatic latch and latch release means for sofa bed head frame sections, responsive to selective movement of the sections respectively to an elevated position and an advanced position.

The foregoing and more detailed objects and advantages will be evident from the following description and the accompanying drawings, in which:

FIG. 1 is a side elevation view of a sofa bed frame embodying the invention in extended position.

FIG. 2 is a top view of one side of the bed frame illustrated in FIG. 1.

FIG. 3 is an enlarged top view of the bed frame showing the improved head section latch.

Figure 4:
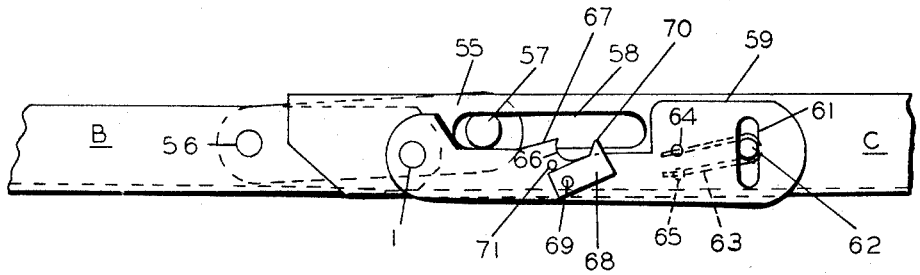
FIG. 4 is an enlarged side elevation view along line 4—4 of FIG. 3 of the head section latch with the head section in horizontal position.

The folding metal frame includes an inner stationary rectangular section A at each side of the sofa bed, fixed to a wooden frame F and a series of generally rectangular sections identified by their side bars B, C, D and E pivotally connected to each other at 1, 2 and 3 respectively. The side bars are duplicated at the opposite side of the frame and are connected by suitable cross members. Side bars B define a rear or head frame section; side bars C define a main intermediate frame section; side bars D define a short intermediate frame section; and side bars E define a front or foot frame section.

Stationary section A comprises a main horizontal member 5 fixed to frame F and an upright member 6 rigidly secured to member 5. An arcuate link 9 is suspended from a pivot 11 and is connected at its free end, at pivot 12 to a bent link 13, the other end of which is connected by pivot 14 to the rear end of main frame section side bar C.

A bell crank 15 is fulcrumed by a pin 16 on side bar C and one end of a bell crank link 17 is pivoted at 18 to the horizontal arm 19 of the bell crank. Bell crank link 17 is fulcrumed at 20 on bent link 13 and the other end of link 17 is pivoted at 21 to straight link 22, the other end of which is pivoted at 23 to an arm 24 depending from bent link 9. One end of an anchor link 25 is pivoted at 26 to bell crank link 17 and its other end is pivoted at its lower end to bar 5.

One end of a link 27 is pivoted at 28 to vertical arm 29 of bell crank 15. The other end of link 27 is pivoted at 30 to a folding leg 31, which is hinged to side bar C. Links 9, 22, 17 and 25 form parts of swing linkage by which bar B is retracted from the advanced position shown in FIGS. 1 and 2 to a folded position.

A smaller bell crank 33 is fulcrumed by pin 2 to the adjacent ends of side bars C and D. One end of an anchor link 35 is pivoted at 36 to the upper arm 37 of bell crank 33. The other end of link 35 is pivoted at 38 to side bar E near but spaced from the inner end of the latter. The other arm 39 of bell crank 33 is slotted at 39S to slidably receive a pin 40 on one end of a link 41, the other end of which is slotted at 41S to slidably receive a pin 42 on the vertical arm 29 of bell crank 15.

Bell cranks 13 and 33 and associated anchors and linkage control the action of bars or sections B, C, D and E as the latter are unfolded and the slots 39S and 41S provide lost motion in the bell crank linkage during certain periods of the folding and unfolding operations, which are generally similar to those detailed in Patent 3,150,384 to W. J. Helton.

The front or foot section bar E is supported by end leg 44 pivoted at 45 on bar E near the end of the latter. A link 51 is pivoted at 52 to leg 44 and at 53 to bar D.

The principal novelty of the structure resides in the latch means for maintaining the rear or head section B in elevated position when desired, as best seen in FIGS. 3–7.

A support link 55 is pivotally connected at one end by pin 56 to bar B and mounts at its other end a pin 57 which rides in a slot 58 in bar C to provide lost motion for moving bar B between its extended and elevated positions. An elongated latch plate 59 is pivoted to bar C on pivot pin 1 with its upper surface generally aligned with the bottom margin of slot 58 when bar B is extended and pin 57 is in the end of slot 58 nearest the end of bar C.

The free end of latch plate 59, remote from pivot pin 1 is vertically slotted as at 61 and a pin 62, mounted on bar C, extends into slot 61 to limit pivotal movement of plate 59. For biasing plate 59 upwardly, i.e., counterclockwise, into engagement with pin 57 on link 55, a U-shaped spring 63 is positioned between plate 59 and bar C and is secured at its upper end at 64 to plate 59 and extends around pin 62 and is secured at its lower end, at 65, to bar C. Intermediate its ends, the top edge 60 of plate 59 is formed with a notch 66 of semicircular shape on the side nearest pivot pin 1 and gradually sloping upwardly on its side remote from pin 1, the upper surface of plate 59 adjacent the semicircular side being slightly sloped upwardly at 67 to form, with the semicircular side of notch 66, a hook-like projection engageable with catch pin 57 on support link 55 when bar B is moved to its elevated position as shown in FIG. 5, spring 63 urging plate 59 upwardly to cause the semicircular surface of notch 66 to hook onto pin 57 and thus maintain bar B and the corresponding head section elevated.

Figure 5:
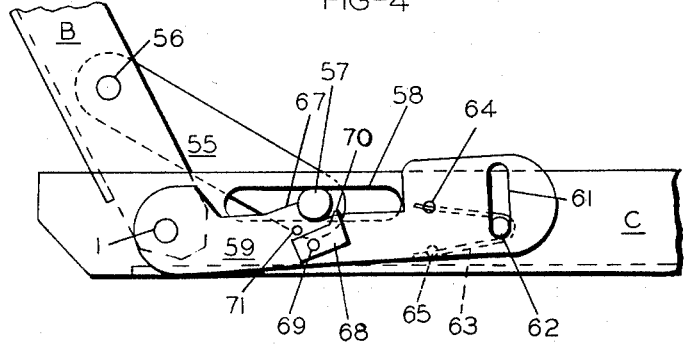
FIG. 5 is a view corresponding to FIG. 4, but showing the head section latched in the elevated position.
Figure 6:
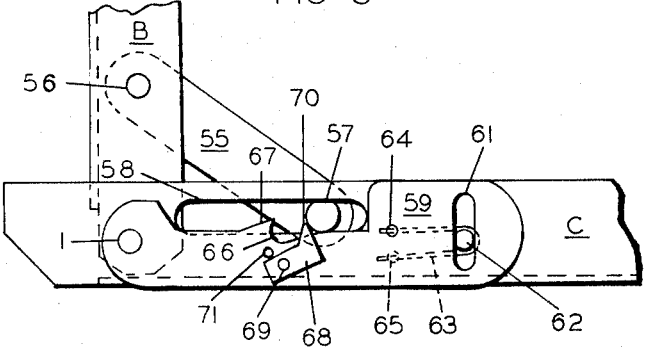
FIG. 6 is a view corresponding to FIGS. 4 and 5, but showing the head section in superelevated position preparatory to releasing the latch.
Figure 7:
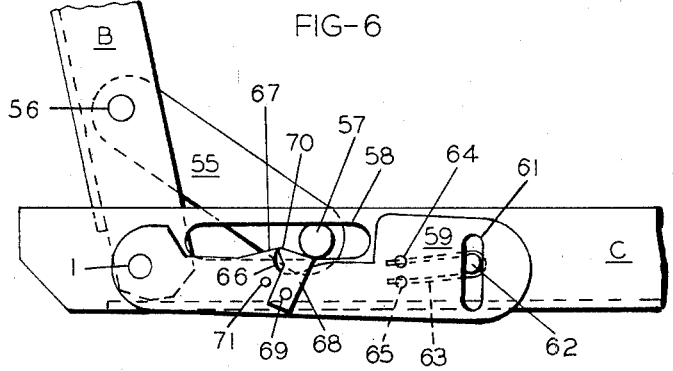
FIG. 7 is a view corresponding to FIGS. 4–6, but showing the head section latch in released position.

For lowering bar B, it is advanced from the normal elevated position shown in FIG. 5 to the upright position shown in FIG. 6, wherein pin 57 is in the forward end of slot 58 and out of notch 66. To permit the return of pin 57 to the rear end of slot 58 without interference from notch 66, a dog 68 is pivoted on plate 59 at 69 and is formed with a projection 70 at its upper end. A rivet 71 on plate 59 is engageable with one side of dog 68 to ensure that the upper end projection of plate 68 will always protrude above the top surface of the latch plate, so that, as bar B is moved downwardly, pin 57 will engage the protruding end of dog 68, rotating the dog counterclockwise from the position shown in FIG. 6 to that shown in FIG. 7, wherein the upper end of dog 68 will provide a ramp for pin 57 to move across notch 66 without being engaged by the latter. Bar B can then be lowered to the position shown in FIG. 4.

Operation of the latch device is as follows: With the bed frame unfolded, as shown in FIGS. 1 and 2, and the latch in the position shown in FIG. 4, the head section is raised until pin 57 is above notch 66. Spring 63 then urges plate 59 upwardly so that the semicircular surface of notch 66 engages pin 57, latching support link 55 and head section bar B against downward movement. To lower the head section, it is advanced from its elevated position, causing pin 57 to move forward in slot 58, overriding the projection 70 on dog 68. The head section is then moved rearwardly, pin 57 causing dog 68 to rotate until its upper end surface closes notch 66. This permits the pin to pass over notch 66, without being engaged by the latter, to the position shown in FIG. 4, with head section bar B extended horizontally.

The details of the structure may be varied without departing from the spirit of the invention and the exclusive use of modifications coming within the scope of the appended claims is contemplated.

What is claimed is:

1. In a sofa bed structure having a folding frame including a main frame member and an end member arranged end to end with a main pivot pin connecting their adjacent ends, an elongated latch plate pivoted at one end on said main pin and extending along said main member and having a notch in one of its longitudinal edges spaced from said main pin, a support link pivoted at one end on said end member at a point spaced from said main pin and having a transversely projecting element at its other end slidable lengthwise of said main member along said notched edge of said latch plate by angular movement of said end member in one direction to enter said notch whereby to hold said end member against return movement, a spring biasing said latch plate against said transversely projecting element, said transversely projecting element being movable to an advanced position on said latch plate by advance movement of said end member, a dog pivoted on said latch plate and engageable by return movement of said projecting element to close said notch and permit return passage of said projecting element over said notch to accommodate retracting angular movement of said end member.

2. In a sofa bed structure according to claim 1, said notch in said latch having its side nearest said main pin undercut to engage said projecting element for positively restraining the latter against return movement.

3. In a sofa bed structure according to claim 2, the opposite side of said notch remote from said main pivot pin being gradually sloped whereby to permit said projecting element to move out of said notch during advance movement of said end member.

4. In a sofa bed structure according to claim 3, said projecting element being cylindrical and the undercut portion of said notch being of corresponding semicircular configuration.

5. In a sofa bed structure according to claim 3, said dog having a portion normally projecting from said notched edge and adapted for engagement with said projecting element upon the return of the latter from its advanced position whereby to move said dog to its notch-closing position.

6. In a sofa bed structure according to claim 4, an element on said latch plate engageable with said dog for maintaining said dog projecting from said notched edge.

7. In a sofa bed structure according to claim 1, said main frame member having an elongated slot aligned with the notched surface of said latch plate when said end member is aligned with said main member, said projecting element extending through and being movable lengthwise in said slot during movement of said end member.

8. In a sofa bed structure according to claim 1, said spring being secured at its one end to said main frame member and at its other end to said latch plate.

9. In a sofa bed structure according to claim 8, there being a vertical slot in said latch plate remote from said main pivot pin, a pin carried by said main frame member and extending through said slot, said spring being of U-shape and extending around said last-named pin.

10. The combination with first and second members arranged end to end with a main pivot pin connecting their adjacent ends, of latch means for maintaining said members in angular relation with each other, said latch means comprising an elongated latch plate pivoted at one end on said main pin and extending along said first member and having a notch in one of its longitudinal edges spaced from said main pin, a support link pivoted at one end on said second member at a point spaced from said main pin and having a transversely projecting element at its other end slidable along said notched edge of said latch plate by angular movement of said second member in one direction to enter said notch and engage a side thereof whereby to hold said end member against return movement, a spring biasing said latch plate against said projecting element, said projecting element being movable to an advanced position on said latch plate by advance movement of said second member, a dog pivoted on said latch plate adjacent said notch and normally positioned clear of said notch and having a surface alignable with said one longitudinal edge of said plate by pivoting of said dog from its normal position, said dog having a portion normally projecting beyond said one longitudinal edge of said plate and engageable with said support link projecting element upon return movement thereof to rotate said dog into notch-closing position with its surface aligned with said one longitudinal edge of said plate whereby to close said notch and permit return passage of said projecting element over said notch to accommodate retracting angular movement of said second member.

References Cited

UNITED STATES PATENTS

| 2,755,487 | 7/1956 | Harman | 5—57 |
| 3,150,384 | 9/1964 | Helton | 5—13 |
| 3,165,757 | 1/1965 | Rogers | 5—13 |
| 3,298,041 | 1/1967 | Rogers | 5—13 |

CASMIR A. NUNBERG, *Primary Examiner.*